March 23, 1954     J. W. GRAY ET AL     2,673,339
GAS DETECTOR

Filed Feb. 25, 1952     3 Sheets-Sheet 2

James W. Gray
Thomas F. Johnson
INVENTORS.

BY *Clarence A. O'Brien*
*and Harvey B. Jacobson*
Attorneys

March 23, 1954    J. W. GRAY ET AL    2,673,339
GAS DETECTOR
Filed Feb. 25, 1952    3 Sheets-Sheet 3

James W. Gray
Thomas F. Johnson
INVENTORS.

BY *[signatures]*
Attorneys

Patented Mar. 23, 1954

2,673,339

UNITED STATES PATENT OFFICE 2,673,339

GAS DETECTOR

James W. Gray and Thomas F. Johnson, Petersburg, Ill.

Application February 25, 1952, Serial No. 273,266

3 Claims. (Cl. 340—237)

This invention relates to a gas detector and particularly to a cylinder for receiving samples of gas and testing the same and a circuit responsive to the test.

In the operation of mines it is positively necessary to test for the presence of gas in order to prevent explosions in the mine. It is desirable to place gas detectors at any point in the mine where gas might accumulate and to periodically make tests therein to insure that there is no accumulation of gas which might cause an explosion.

The present invention comprises a gas detector having a cylinder which can be mounted adjacent to the accumulated spots of gas and means for periodically reciprocating a piston in the cylinder to take samples of the gas adjacent to the cylinder and to create a spark or other ignition device within the cylinder so that an explosive mixture of gas will produce an explosion operating a detecting circuit.

According to the present invention the reciprocating device for the cylinder comprises a storage battery and a motor and operating device enclosed in a gas-tight casing and mounted adjacent to the cylinder so that the operating device may be periodically energized by any suitable means such as a timer or clock so that periodic tests of gas are made and samples tested.

It is accordingly an object of this invention to provide an improved testing device.

It is a further object of this invention to provide a gas testing device in which all of the working parts are enclosed in gas-tight chambers.

A further object of this invention is to provide a gas testing device having timing means for periodically energizing the gas testing device.

It is a further object of this invention to provide a gas testing device which will automatically shut itself off after detecting an explosive quantity of gas.

It is a further object of this invention to provide a gas testing device which will energize a signal circuit in response to an explosive quantity of gas.

Other objects and many of the attendant advantages of this invention will be apparent from the following detailed description taken in conjunction with the accompanying drawings:

Figure 6 is an enlarged fragmentary diagram of the signal board.

Figure 1:
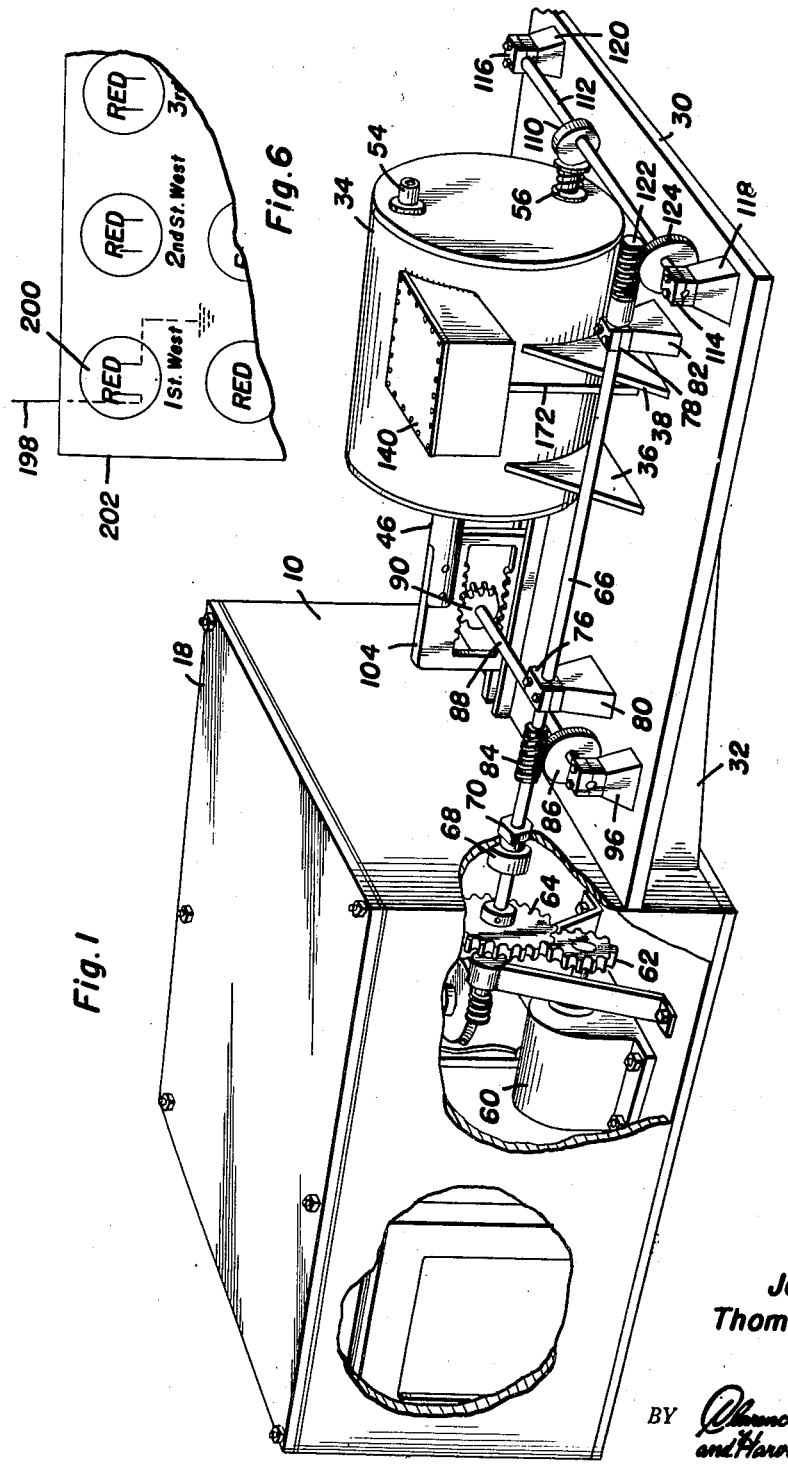
Figure 1 is a perspective view of the gas detector with parts broken away to show the construction.
Figure 2:
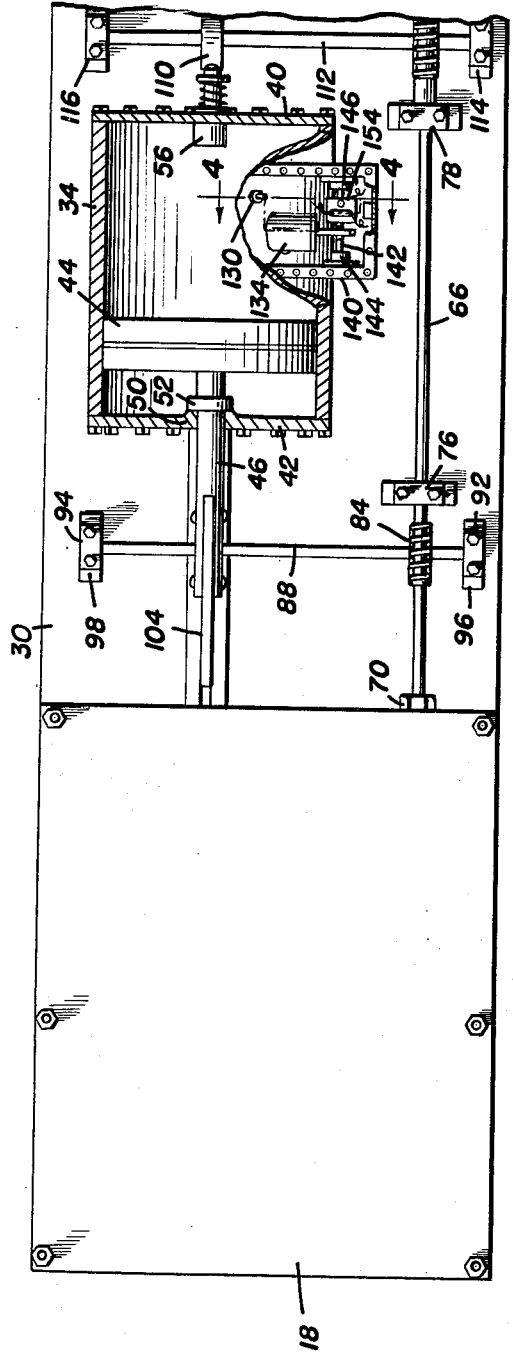
Figure 2 is a top plan view with parts broken away and in section.
Figure 3:
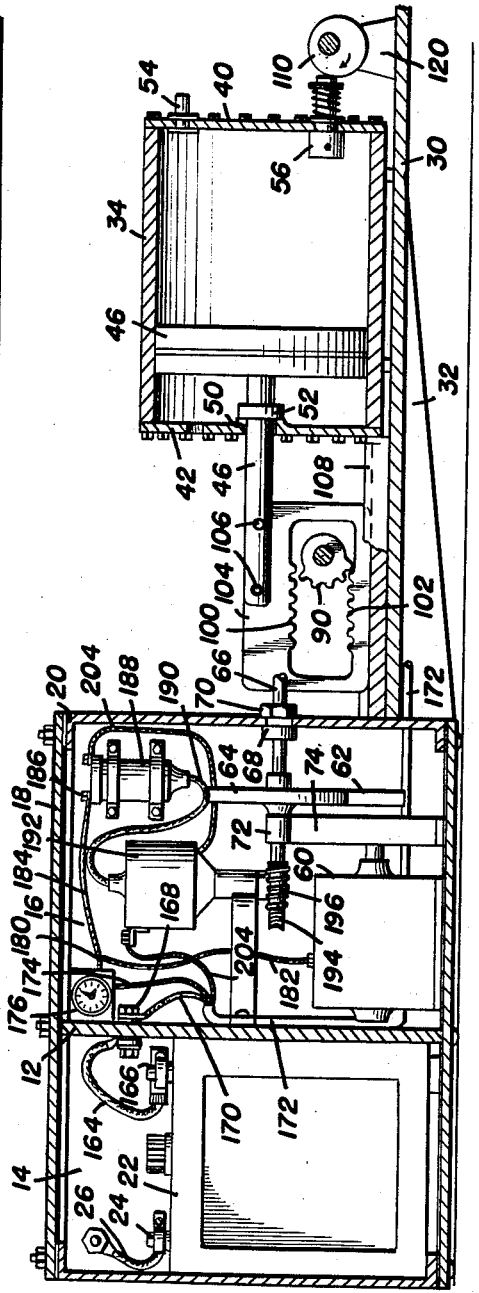
Figure 3 is a vertical longitudinal section taken substantially on the plane indicated by the line 3—3 of Figure 2 and showing the arrangement of parts.

In the exemplary embodiment according to the invention a gas-tight chamber 10 is provided with a cross partition 12 to provide a plurality of interior chambers 14 and 16. The gas-tight chamber 10 is provided with a cover 18 which is mounted in gas-tight relation to the casing by means of a gasket 20. An energy storing device such as a battery 22 is mounted within the chamber 14 and has one terminal 24 connected to ground by a suitable conductor 26.

A platform 30 is mounted adjacent one end of the casing 10 by means of brackets 32. A test cylinder 34 is mounted on the platform 30 by means of suitable brackets 36 and 38. The cylinder 34 is provided with end closures 40 and 42, with the closure 40 being secured in gas-tight relation to the end of the cylinder. The piston 44 is reciprocally mounted in the cylinder 34 and has attached thereto a piston rod 46 which extends through the rear end 42 of the cylinder 34. The end 42 is provided with a seat 50 and the piston rod 46 is provided with a stop 52. The seat 50 and the stop 52 are in contact when the piston is at one end of its stroke so that the piston is firmly and securely mounted within the cylinder at the end of the stroke. An intake valve 54 and an outlet valve 56 are mounted in the end 40 of the cylinder 34.

A driving arrangement for the testing device comprises a motor 60 mounted in the chamber 16 of the casing 10. The motor 60 being provided with a pinion 62 meshing with a gear 64 which is fixed on a drive shaft 66. The drive shaft 66 extends through the end of the closure 10 and is provided with a gas-tight gland 68 which is held in gas-tight relation by means of a nut 70. The drive shaft 66 is mounted in a bearing 72 of a bracket 74 mounted in the chamber 16 also bearings 76 and 78 mounted on brackets 80 and 82 mounted on the platform 30. A motor thus connected in driving relation so that the shaft 66 is rotated when the motor 60 is energized.

A worm 84 is mounted on the shaft 66 and the worm gear 86 mounted on a transverse shaft 88 has a sector gear 90. The transverse shaft 88 being mounted in bearings 92 and 94 supported on brackets 96 and 98. The sector gear 90 ordinarily connects racks 100 and 102 made in rack bar 104. Rack bar 104 being firmly connected to the piston rod 46 by means of suitable fasteners such as rivets 106. The rack bar 104 has the lower edge thereof slidably mounted in a rack guide 108 which is suitably mounted on the platform 30.

The sector gear when rotated will engage first the rack 100 and push the pistons 44 toward the end 40 of the cylinder 30 and expel all of the gases within the cylinder through the valve 56. The sector gear 90 will then contact the rack 102 and retract the pistons 44 to draw gases in through the intake valve 54. The valve 56 is controlled by a cam 110 mounted on a cam shaft 112 which is carried in bearings 114 and 116 mounted on brackets 118 and 120 mounted on the platform 30. The worm 122 is mounted on the drive shaft 66 and a worm gear 124 mounted on the shaft 112 is in mesh with the worm 122.

The cylinder 34 has an ignition device, such as a spark plug 130 mounted therein. The cylinder 34 is provided with an outlet port 132, and an auxiliary cylinder 134 is mounted on the exterior of the cylinder 34 and in communication with the outlet port 132. The auxiliary cylinder 134 is provided with a piston 136 having a square piston rod 138. The auxiliary cylinder 134 is mounted in a control box 140 which is secured in substantially gas-tight relation to the exterior of the cylinder 34 and extending laterally therefrom. A butterfly shaft 142 is mounted transversely of the box 140 in suitable bearings 144 and 146. A gear 148 is rigidly mounted on the butterfly rod 142 and the rack bar 150 on the end of the square shaft 138 is provided with a rack 152 which engages the gear 148. A butterfly element 154 is rigidly mounted on butterfly shaft 142 and carries a pair of switches 156 and 158. A magnet 160 is mounted on the end of the chamber 140 and cooperates with an armature 162 on the butterfly 154 and biases the butterfly into a predetermined position.

A control system for the motor 60 includes a conductor 164 connected to the terminal 166 of the battery 22 and extending from the chamber 14 to the chamber 16 by an insulated bolt 168. A conductor 170 extends through a gas-tight conduit 172 from chamber 16 into the chamber 140. A conductor 170 in the chamber 140 is connected to both the mercury switches 156 and 158. The switches 156 and 158 being mounted perpendicular in relation to each other and in perpendicular relation to the shaft 142. When the magnet 160 and the armature 162 are normally biasing the butterfly into normal position, the switch 158 will connect conductor 170 to conductor 174 which returns through the conduit 172 into the chamber 16 where it is connected to a timing device 176, herein shown as a clock. The clock having a switch (not shown) which periodically connects the conductor 174 to the conductor 180 one branch of which 182 connects in the motor 60 and the other branch 184 connects to the low voltage terminal 186 of an induction device 188. The ground terminal of the induction device 188 is connected to a conductor 190 which extends to a breaker 192. The breaker 192 is driven by a worm gear 194 which meshes with a worm 196 on the drive shaft 66.

A mercury switch 156 on the butterfly 154 has a terminal connected to a conductor 198 returning to a signal device such as an alarm 200.

Preferably the signals 200 from each of the sparking devices are assembled together on a board 202, this can be mounted in suitable place such as a supervisor's office. A high voltage potential of the induction device 188 is connected to a conductor 204 which passes through the conduit 172 into the chamber 140 where it is connected to the spark plug 130.

Figure 4:
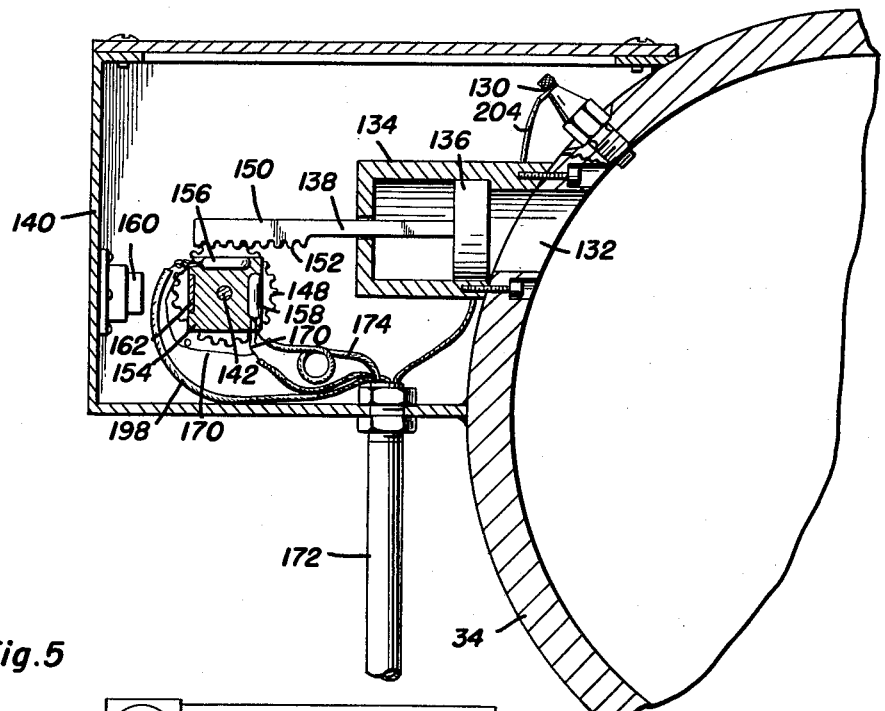
Figure 4 is an enlarged cross-section of the signal switch actuating mechanism and taken substantially on a plane indicated by the line 4—4 of Figure 2.
Figure 5:
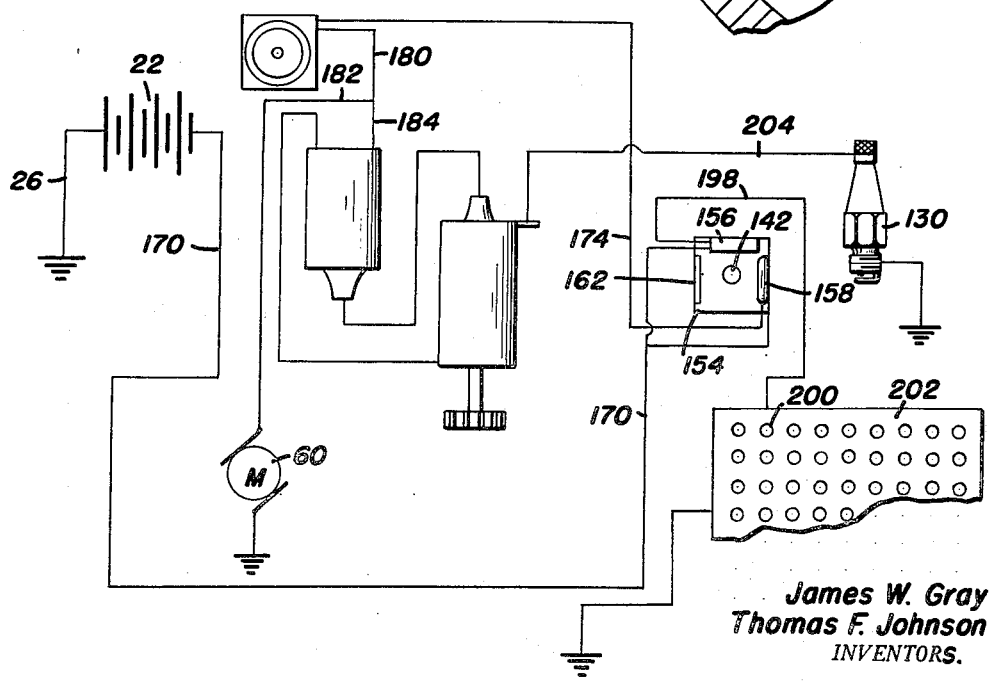
Figure 5 is a schematic wiring diagram.

In the operation of the devices the worm gears 86, 144, 194 are so related that in the operation all of the devices are synchronized. Assuming that the butterfly is in the position shown in Figure 4 with the magnet biasing the butterfly into a so-called normal position, the clock will after a predetermined interval energize the motor 60 which will drive the drive shaft 66 which will simultaneously drive the worms 84 and 122 and 196. The worm 84 will drive the worm gear 86 which will drive the sector gear 90 to contact the rack 100 to move the piston 44 to the end 40 of the cylinder 34. Simultaneously the worm 122 will actuate the worm gear 144 so that the cam 110 will open the outlet 56 so that any gases or anything else in the cylinder 34 will be expelled therefrom. At the end of the scavenging stroke the cam 110 will release the valve 56, the sector gear 90 will contact the rack 102 so that the piston 44 will be jammed so that the seat 50 will receive the stop 52 and any gases accumulated near the cylinder will be drawn in through the intake valve 54 which is preferably mounted at the extreme top of the cylinder and if necessary may be provided with any suitable extension into the place where gases are expected to be accumulated. Cam 110 will remain in position so that the valve 56 is closed when the piston is in position so that the stop 52 is on the seat 50. Simultaneously the worm 196 will attend the worm gear 194 so the breaker 192 energizes the induction coil 188 the output of which will be carried over the conductor 204 to the spark plug 130 so that any combustionable mixture in the cylinder 34 will be exploded. The explosion of the explosive mixture within the cylinder 34 will produce an increase in pressure therein which will oscillate the piston 136 in the auxiliary cylinder 134 and cause the rack 152 to rotate the gear 148 so that the switch 158 will be open and the switch 156 will be closed thereby de-energizing the conductor 174 and energizing the conductor 198 so that the presence of any explosive quantity of gas will be shown on the indicator board 202 and the testing device will be deenergized to prevent any possibility of a spark being transmitted to the explosive mixture.

In the construction of the device the conduit 172 will either be filled with material or have the ends so fixed that no gas can pass through the conduit 172. Preferably the conductor 198 will also be mounted in a conduit or other protector which will be connected into the conduit 172 in any suitable gas-tight manner.

It will thus be seen that the present invention provides an automatic gas testing equipment which can be installed in any or various places in the mine and will periodically test the gases therein and in the event there is an accumulation of dangerous gases will not only shut the sparks off to prevent any activation of the gases thereabout but will give a signal so that suitable provisions can be made for eliminating the gassy condition.

For purpose of exemplification a particular embodiment of the invention has been shown, and described according ot the best understanding thereof, however, it will be apparent to those skilled in the art that many changes and modifications can be made without departing from the true spirit of the invention.

Having described the invention, what is claimed as new is:

1. A mine gas detector comprising a gas receiving cylinder, a piston reciprocably mounted in said cylinder, intake and outlet valves in said cylinder, a battery, a motor, circuit means including clock means periodically connecting said motor to said battery, a drive shaft driven by said motor, a substantially gas tight casing enclosing said battery and said motor, said drive shaft extending through said casing, a substantially gas tight gland sealing said shaft to said casing, a first worm on said drive shaft, a piston rod on said piston, a rack bar secured on said piston rod, a guide track, said rack bar slidably received in said guide track, a first worm gear contacting said first worm, a transverse shaft driven by said first worm gear, a sector gear on said transverse shaft, said sector gear engaging said rack bar, a second worm on said shaft, a second worm gear meshing with said second worm, a cam shaft driven by said second worm gear, a cam on said cam shaft, said cam controlling said outlet valve, an ignition device in said cylinder, an ignition circuit connecting said battery to said ignition device, said ignition circuit including an induction device and a breaker, a third worm on said shaft, a third worm gear meshing with said third worm and being operatively connected to said breaker, a seat in said cylinder, a stop connected to said piston, said worm gears being so related that said breaker energizes said ignition device while said stop is in contact with said seat and said outlet valve is in closed position, a port in said cylinder, an auxiliary cylinder communicating with said port, a butterfly, a gear on said butterfly, a pair of mercury switches on said butterfly, said switches being perpendicular to each other and to the axis of the butterfly, a rack engaging said gear, a control piston in said auxiliary cylinder, said control piston being responsive to an explosion in said cylinder to propel said rack to rotate said butterfly.

2. Apparatus according to claim 1 wherein one of said mercury switches is connected in said circuit including said clock means where said mercury switch controls the energization of said clock means, the other of said mercury switches being connected in controlling relation with an auxiliary circuit.

3. A mine gas detector comprising a substantially closed cylinder, a piston reciprocally mounted in said cylinder, inlet and outlet valves in one end of said cylinder, a piston rod secured to said piston and extending from the other end of said cylinder, a seat on said cylinder, said seat surrounding said piston rod, a stop on said piston rod adapted to contact said seat, a battery, an electric motor energized from said battery, gearing interposed between said motor and said piston rod for reciprocating said piston, an ignition device in said cylinder, an induction device, circuit means including said induction device connecting said battery to said ignition device, breaker means driven by said motor for energizing said ignition device only while said stop is in contact with said seat, a port in said cylinder, an auxiliary cylinder communicating with said port, an auxiliary piston slidable in said auxiliary cylinder, a piston rod on said auxiliary piston, a switch support journaled adjacent said auxiliary cylinder, a gear secured to said support, a rack secured on said piston rod, said rack being in driving engagement with said gear, a pair of tilt type switches mounted on said support, said switches being arranged perpendicular to each other and to the axis of rotation of said support.

JAMES W. GRAY.
THOMAS F. JOHNSON.

References Cited in the file of this patent
UNITED STATES PATENTS

| Number | Name | Date |
|---|---|---|
| 261,384 | Richardson | July 18, 1882 |
| 977,947 | Grobs | Dec. 6, 1910 |
| 1,088,611 | Neubauer | Feb. 24, 1914 |
| 1,107,232 | Nichols et al. | Aug. 11, 1914 |
| 1,150,505 | Diehl et al. | Aug. 17, 1915 |
| 1,703,497 | Noah | Feb. 26, 1929 |
| 1,977,481 | Jones | Oct. 16, 1934 |
| 2,125,370 | Ferguson | Aug. 2, 1938 |
| 2,170,056 | Keinath et al. | Aug. 22, 1939 |
| 2,219,391 | Jacobson | Oct. 29, 1940 |
| 2,337,330 | Zulin | Dec. 21, 1943 |